US005691507A

United States Patent [19]

Wei

[11] Patent Number: 5,691,507

[45] Date of Patent: Nov. 25, 1997

[54] PROTECTIVE COVER FOR OUTLET

[76] Inventor: Ming-chin Wei, 3F-2, No. 13, Wuchuan 1st Rd., Wuku Industrial Park, Hsinchuang, Taipei Hsien, Taiwan

[21] Appl. No.: 610,273

[22] Filed: Mar. 4, 1996

[51] Int. Cl.$^6$ .................... H02B 1/14

[52] U.S. Cl. .................... 174/67; 220/3.8

[58] Field of Search .................... 174/67, 66; 220/3.8, 220/3.4, 3.2; 439/148

[56] References Cited

U.S. PATENT DOCUMENTS

| | | | |
|---|---|---|---|
| 3,434,618 | 3/1969 | MacDonald | 220/24.2 |
| 4,662,697 | 5/1987 | Moses | 339/38 |
| 5,096,430 | 3/1992 | D'Amico | 439/148 |
| 5,285,014 | 2/1994 | Gilchrist | 174/67 |
| 5,320,542 | 6/1994 | Cheng | 439/148 |

*Primary Examiner*—Kristine L. Kincaid
*Assistant Examiner*—Joseph Waks
*Attorney, Agent, or Firm*—Oppenheimer Poms Smith

[57] ABSTRACT

A protective cover for an electricity supply outlet provides a body, a peg slidingly retained in the body, a spring urging against the peg, a disk fixedly secured to the body to retain the spring therein and a pair of spaced apart tongues insertable into passages of the electrical supply outlet. The protective cover has a smooth non-graspable periphery. The peg is rotatable from a first position where a top end thereof is flush with a top face of the body to a second position where it partially extends beyond the top face of the body thereby permitting access to a slot defined in the peg such that a pin of an electrical appliance plug may be inserted therein to remove the protective cover from the electricity supply outlet without the use of extra or specialized tools.

19 Claims, 4 Drawing Sheets

PROTECTIVE COVER FOR OUTLET

BACKGROUND OF THE INVENTION

1. Field of the Invention

The present invention relates to a protective cover, and more particularly to a protective cover for an electricity supply outlet.

2. Description of Related Art

This invention has particular application to electricity supply outlets. Plug holes of a conventional electricity supply outlet are exposed outside such that children risk receiving an electric shock if their fingers probe the plug holes or a stick-like object which is held by the children is inserted into the plug hole. Moreover, the surface of the outlet becomes a conductor if the surface becomes wet through being splashed by water when the outlet is in the bathroom, which is extremely dangerous not only for children but also for adults.

The present invention provides a protective cover for an electrical supply outlet to mitigate and/or obviate the aforementioned problems.

SUMMARY OF THE INVENTION

The primary object of the present invention is to provide a protective cover which is inserted into an electrical supply outlet thereby causing the outlet to be not exposed externally.

The other object of the present invention is to provide a protective cover with an extending peg which can permit the cover to be removed from an electrical supply outlet by using a pin of an electrical appliance plug and without using any other special tools.

In accordance with the present invention, there is provided a protective cover comprising a body defining a longitudinal through-hole therewithin; removal means for taking the body off the outlet, said removal means received in the through-hole of the body; a disk mounted to a lower end of the removal means for preventing the removal means being disengaged from the body; and a spring disposed between the removal means and the base disk. The body further defines a conterbore defined at a bottom of the through-hole, an shoulder formed at an upper portion of a periphery defining the through-hole and two diametrically opposite notches each defined in the shoulder.

The means comprises a peg, said peg having a groove defined in a top end thereof, two tabs each projecting outward from an outer periphery thereof, a transverse slot defined slightly below the tabs and a flange formed at a bottom thereof. The peg is slidingly receivable in the through-hole. The spring is received in the through-hole with a first end urging against a bottom end of the peg and a second end retained by the disk which is fixedly retained in the counterbore. In a first position, the tabs do not align with the notches and the top end of the peg is flush with a top face of the body such that the protective cover presents a smooth non-graspable periphery. In a second position the peg is rotated such that the tabs align with the notches and the peg is urged by the spring to project partially beyond the top face of the body such that the transverse slot is accessible to a pin of an electrical appliance plug, permitting the cover to be pulled out of the electrical supply outlet.

According to another aspect of the present invention, there is provided a protective cover for an electrical supply outlet comprising a body with a longitudinal through-hole defined by a periphery and a stud threadedly received in the longitudinal hole of the body, the stud having a groove defined in a top end thereof and a transverse slot defined at an upper portion thereof.

Other objects, advantages, and novel features of the invention will become more apparent from the following detailed description when taken in conjunction with the accompanying drawings.

FIELD OF THE INVENTION

This invention relates to a protective cover, and more particularly, to a protective cover for an electricity supply outlet.

DESCRIPTION OF THE PREFERRED EMBODIMENT

Figure 1:
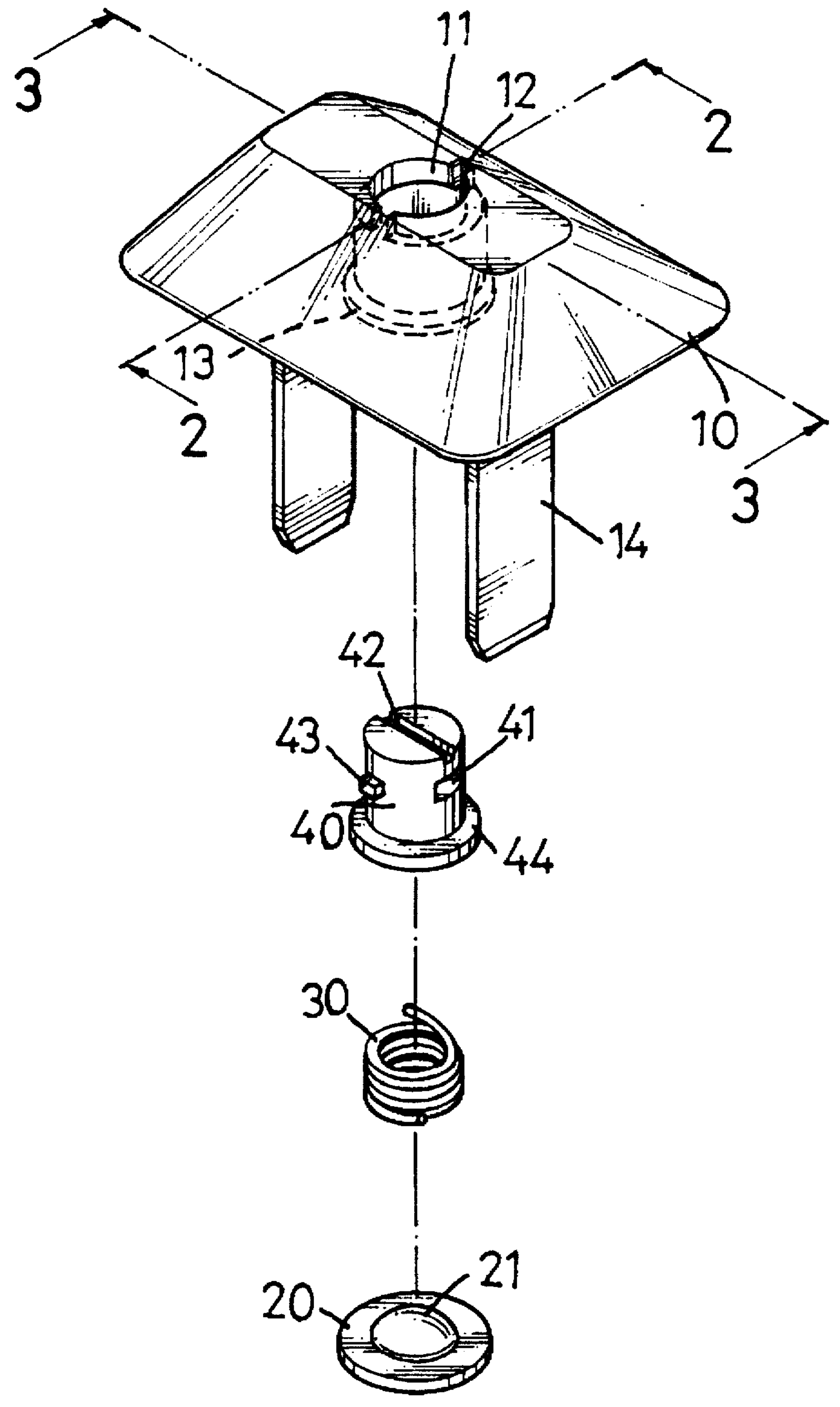
FIG. 1 is an exploded view of a protective cover in accordance with the present invention.

Referring now to the drawings wherein the descriptions are for purposes of illustrating a preferred embodiment of the present invention only, and not for purposes of the present invention only, and not for purposes of limiting the same. Referring to drawings and in particular FIG. 1, a protective cover in accordance with the present invention comprises a body 10, a disk 20, a spring 30 and a peg 40.

The body 10 has a top face, a bottom face and four inclined walls extending therebetween to form a frustrum. A central through-hole 11 extends from the top face to the bottom face of the body 10, two spaced apart tongues 14 extend integrally and perpendicularly from the bottom face. The tongues 14 are sized and configured to be identical to pins 81 (see FIG. 6) of an electrical appliance plug 80 such that they fit into slots defined in an electrical supply outlet 70. A periphery defining the through-hole 11 further defines a conterbore 13 adjacent to the bottom face of the body 10, and a shoulder 15 defining a neck 18 adjacent to the top end of the body 10 whereby two diametrically opposite notches 12 are defined in the shoulder 15.

The peg 40 has a substantially cylindrical trunk with a top end having a transverse groove 42 defined therein, a flange 44 extending outward at a bottom end thereof, two diametrically opposed tabs 43 extending integrally and radially from a mediate point of the trunk, a slot 41 extending transversely through the trunk at the mediate point thereof and perpendicular to the tabs 43 and a recess 48 defined in a bottom end face.

It is to be noted that the tabs 43 are sized and configured to pass through the notches 12, the trunk has a diameter sized to be slidingly received in the neck 18, and the flange 44 has a diameter nominally smaller than the through-hole 11 such that it may be slidingly received therein.

The disk 20 has a protrusion 21 on a top face thereof and is sized to be retained in the conterbore 13 by means such as an interference fit or adhesive. The spring 30 is sized to be received in the through-hole 11.

Figure 2:
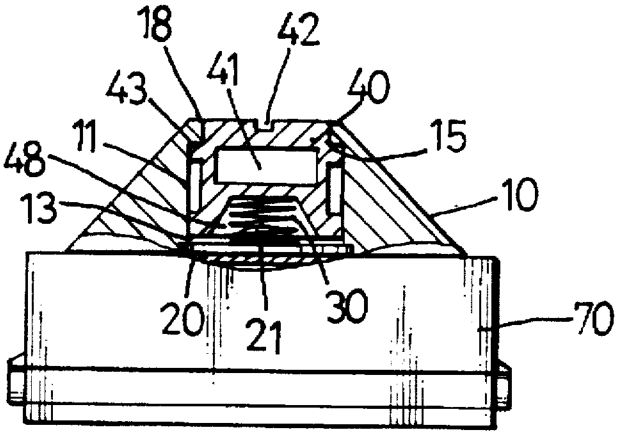
FIG. 2 is an assembled cross-sectional view taken along line 2—2 of the protective cover of FIG. 1 inserted in an electricity supply outlet.

In assembly, referring to FIG. 2, the peg 40 in a first status is disposed in the through-hole 11 such that the tabs 43 are not aligned with the notches 12 such that top of end the peg 40 is flush with the top end of the body 10. The spring 30 is disposed in the through-hole 11 with a first end urging into the recess 48 of the bottom end of the peg 40. The disk 20 is securely retained in the conterbore 13 with a second end of the spring disposed over the protrusion 21. Thus, the spring 30 is in a compressed state.

When the protective cover is fitted to the electric supply outlet 70 in this first status, it presents a smooth exterior virtually impossible to grasp by hand thereby preventing a child from removing it and thus exposing him/herself to the electricity supply.

Figure 3:
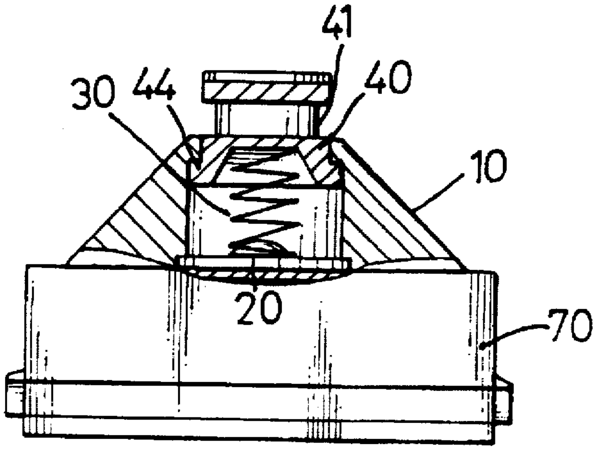
FIG. 3 is a cross-sectional view taken along line 3—3 of FIG. 1, showing an activated state of the protective cover of FIG. 1.
Figure 6:
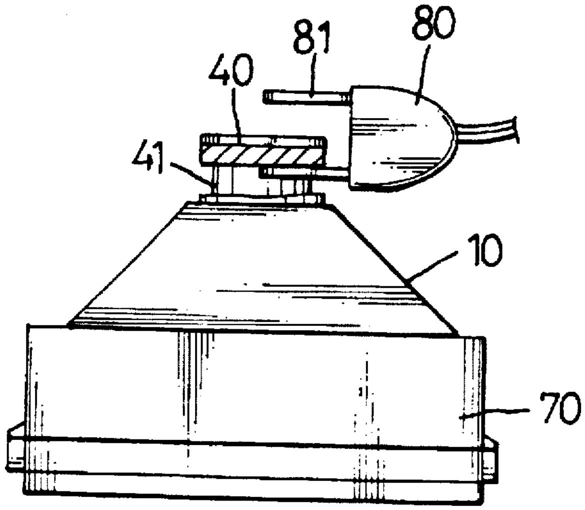
FIG. 6 is a cross-sectional view of the protective cover showing the a pin of an electrical appliance plug inserted into the transverse hole.

Referring to FIG. 3, the peg 40 is in a second status wherein the tabs 43 are moved by means of an implement such as a coin etc, in the groove to align with the notches 12 of the body 10 whereby spring 30 urges the peg 40 to project beyond the top face of the body 10 and the flange 44 of the peg 40 abuts the shoulder 15 of the body 10. The slot 41 of the peg 40 is now accessible to receive an implement, such as the pin 81 of the electrical appliance plug 80, as shown in FIG. 6 whereby the protective cover can be pulled out of the electricity supply socket 70.

Figure 4:
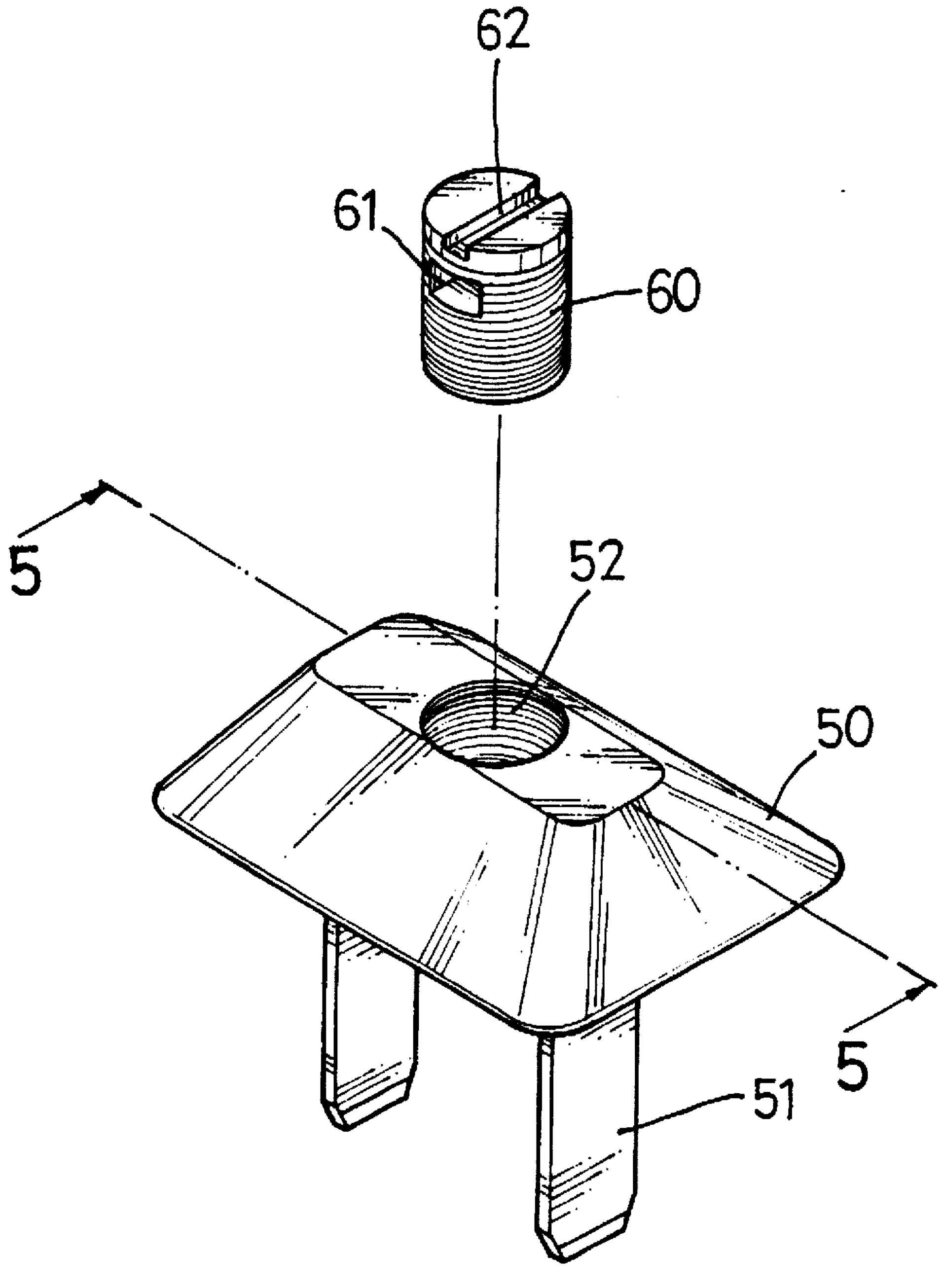
FIG. 4 is an exploded view of another embodiment of the protective cover.
Figure 5:
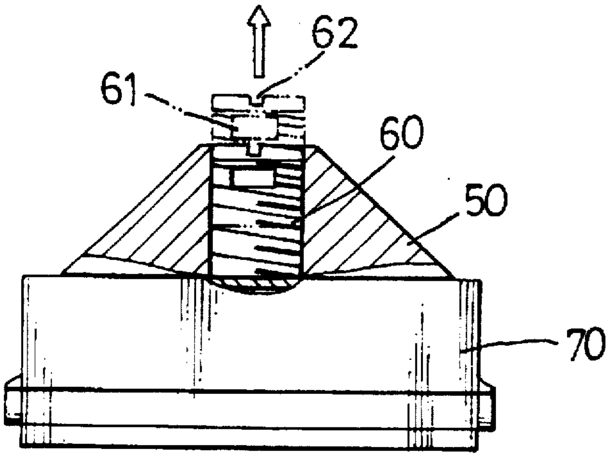
FIG. 5 is a cross-sectional view taken along line 5—5 of another embodiment showing an activated state of the protective cover of FIG. 4.

Referring to FIGS. 4 and 5, a second embodiment is shown where a protective cover comprises a body 50 defining a through-hole 52 defined by a threaded periphery and a threaded stud 60 sized to threadedly extend into the hole 52 of the body 50. In a manner similar to the first embodiment, the stud 60 has a transverse groove 62 defined in an upper end face thereof and a transverse slot 61 defined in an upper portion thereof. The stud 60 is movably received in the longitudinal hole 52 and can be turned and moved upwardly by the pin 81 of the electrical appliance plug 80. In the position shown in FIG. 5, the transverse slot 61 just emerges from the top face of the body 50, whereby the user can insert the pin 81 of the electrical appliance plug 80 into the hole 61 and then pull out the protective cover from the outlet (shown in FIG. 6)

It should be clear to those skilled in the art that further embodiments of the present invention may be made without departing from the teachings of the present invention.

I claim:

1. A protective cover for electrically insulating and mechanically concealing hot slots of an electrical supply outlet comprising:

a body having a top surface, a bottom surface of a sufficient dimension to cover the hot slots, and a hole provided through the top surface;

a plurality of tongues extending from said bottom surface for inserting into the hot slots of the electrical supply outlet; and means received in the hole for removing said body from said electrical supply outlet; wherein said hole is a through-hole for disposing said removing means from a bottom of the through-hole and said removing means comprises a peg slidably retained within the through-hole and a spring for urging said peg to protrude from the top surface of the body, the body being removable via a protruded portion of the peg.

2. The protective cover as claimed in claim 1 wherein an inner periphery of said through-hole comprises an annular shoulder on its upper portion and an outer periphery of said peg comprises a flange on its bottom such that said peg is slidably engaged with said annular shoulder and said flange prevents said peg from escaping out of said through-hole when the peg is urged upward.

3. The protective cover as claimed in claim 2 wherein said annular shoulder comprises a pair of notches in diametrically opposite positions and said peg comprises a pair of tabs in diametrically opposite positions such that said pair of tabs may pass through said pair of notches as said pair of tabs and said pair of notches are aligned.

4. The protective cover as claimed in claim 3 wherein said peg further comprises a transverse groove on its top.

5. The protective cover as claimed in claim 3 wherein said peg further comprises a transverse slot.

6. The protective cover as claimed in claim 1 wherein said spring is a coil spring and a disk is disposed and securely retained at the bottom of said through-hole to retain said coil spring therein.

7. The protective cover as claimed in claim 6 wherein said peg further comprises a recess on its bottom surface for receiving said coil spring.

8. The protective cover as claimed in claim 6 wherein said disk comprises a central protrusion projecting from its upper central surface for positioning said coil spring.

9. The protective cover as claimed in claim 1, wherein said through-hole further comprises a counterbore in its bottom for fitting said disk therein.

10. The protective cover as claimed in claim 1 wherein said hole has internal threads on its inner surface and said removing means comprises a stud having external threads on its outer surface, said external threads being engaged with said internal threads.

11. The protective cover as claimed in claim 10 wherein said stud comprises a transverse groove on its top.

12. The protective cover as claimed in claim 10 wherein said stud further comprises a transverse slot.

13. The protective cover as claimed in claim 1 wherein said body is a frustum.

14. The protective cover as claimed in claim 13 wherein said frustum is a frustum of pyramid.

15. The protective cover as claimed in claim 13 wherein said frustum is a frustum of cone.

16. The protective cover as claimed in claim 1 wherein said top surface and said bottom surface of the body are substantially parallel to each other.

17. The protective cover as claimed in claim 1 wherein said top surface and said bottom surface of the body are not parallel to each other.

18. The protective cover as claimed in claim 1 wherein said plurality of tongues are a pair of tongues.

19. The protective cover as claimed in claim 18 wherein said pair of tongues substantially vertically extend from said bottom surface and are substantially parallel to each other.

* * * * *